March 28, 1939.  E. R. BARRETT  2,151,887
VEHICLE LOADING DEVICE
Filed Dec. 1, 1937  5 Sheets-Sheet 1
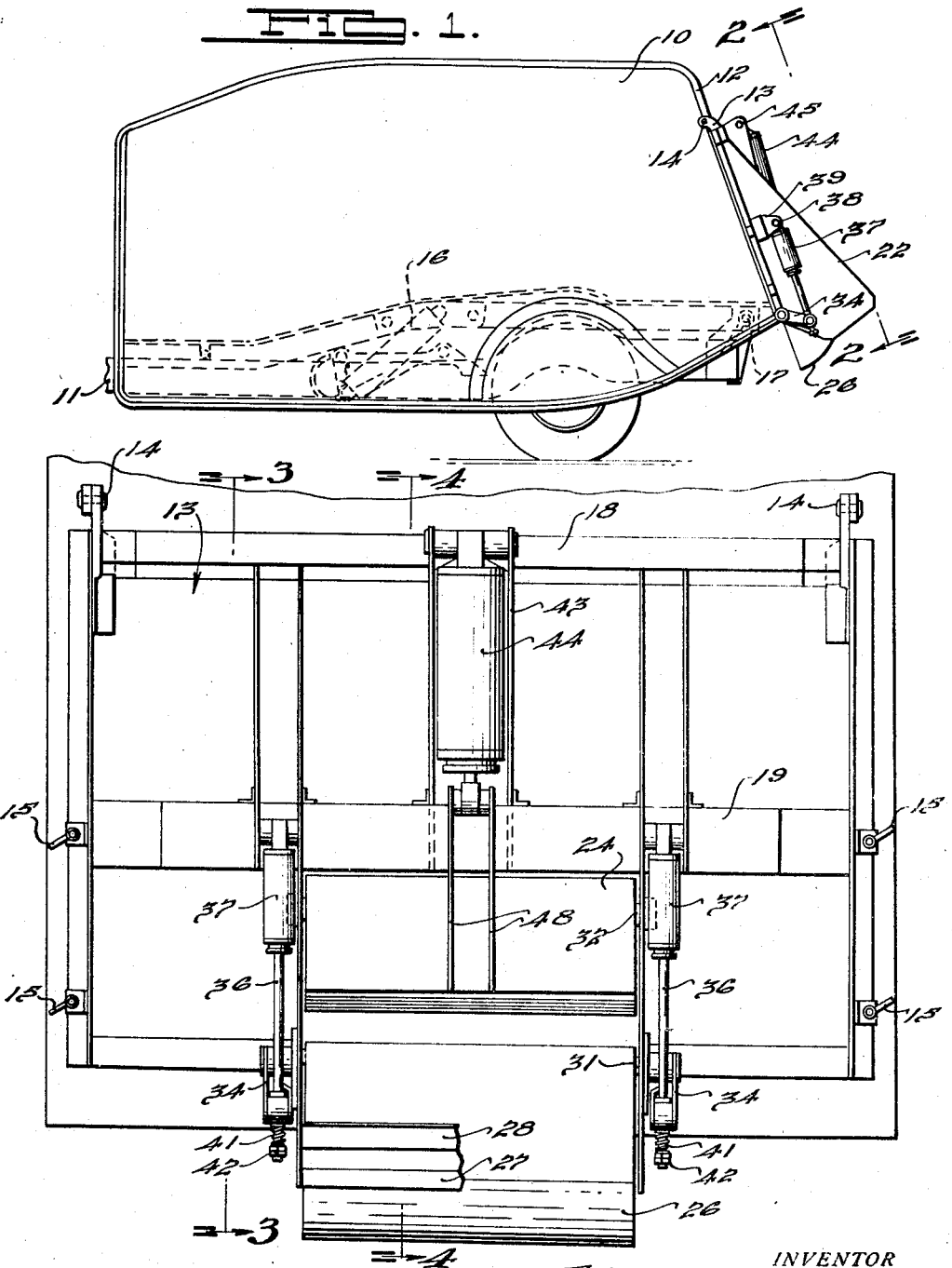
INVENTOR
Edward R. Barrett.
BY
Harness, Dickey & Pierce
ATTORNEYS.

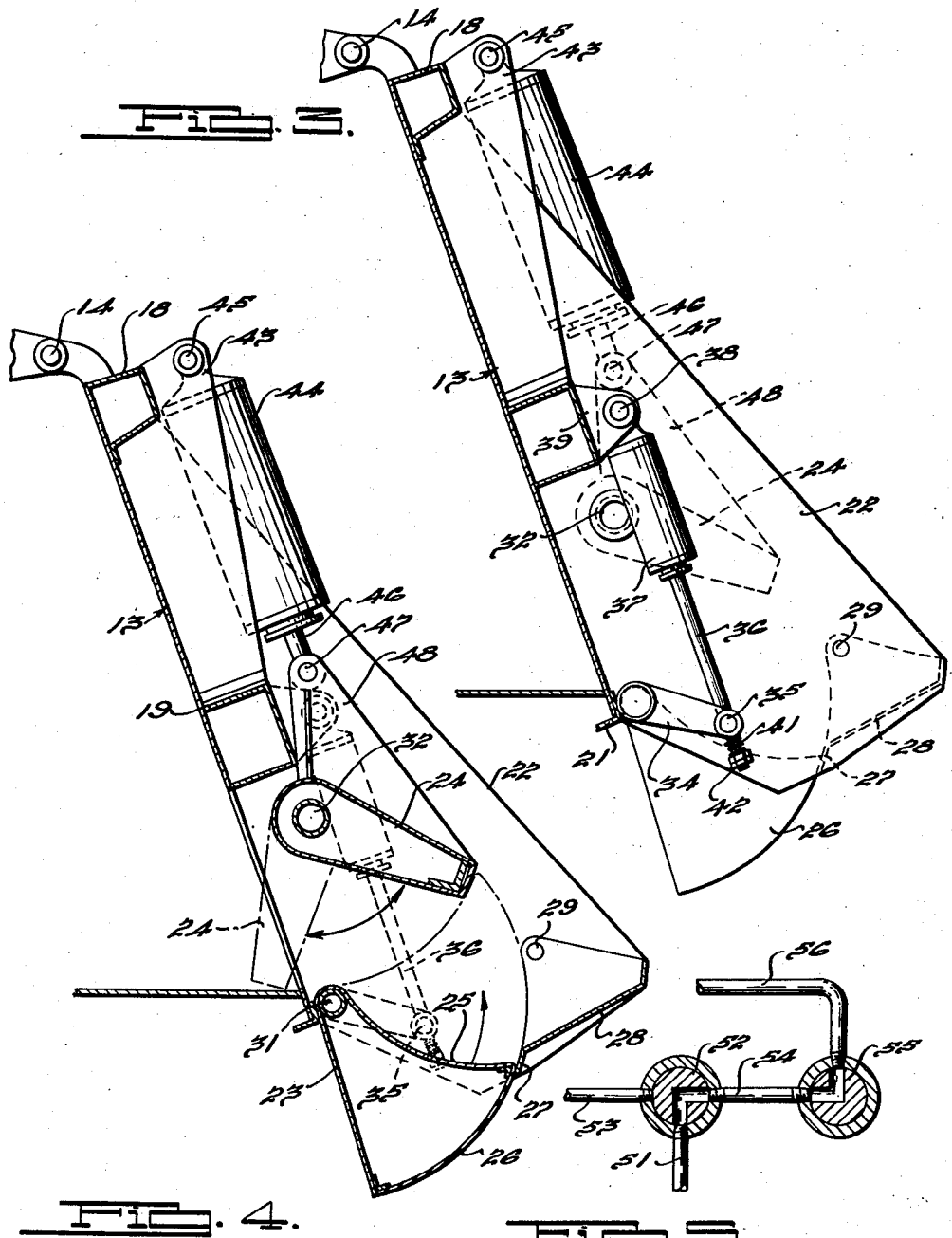

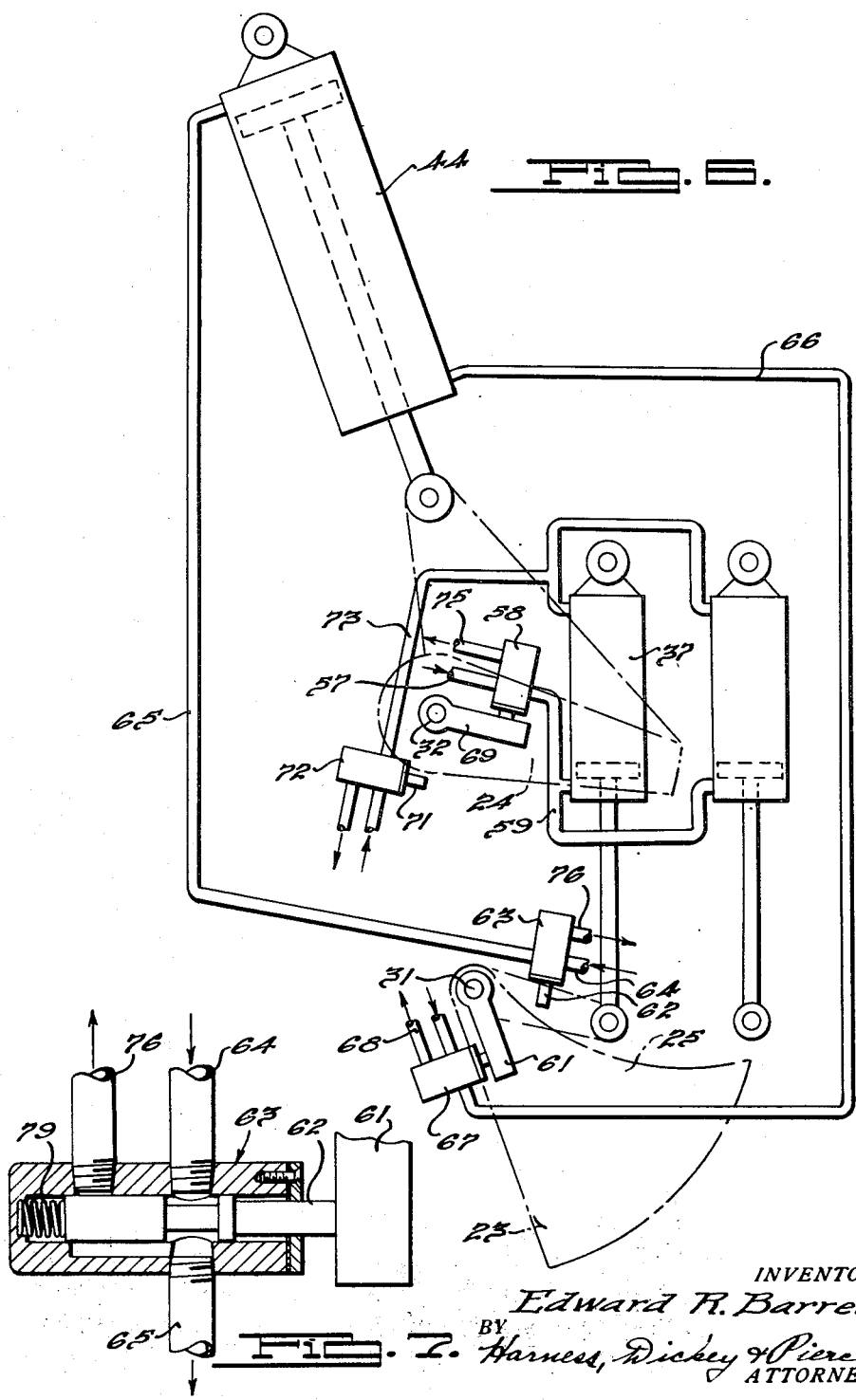

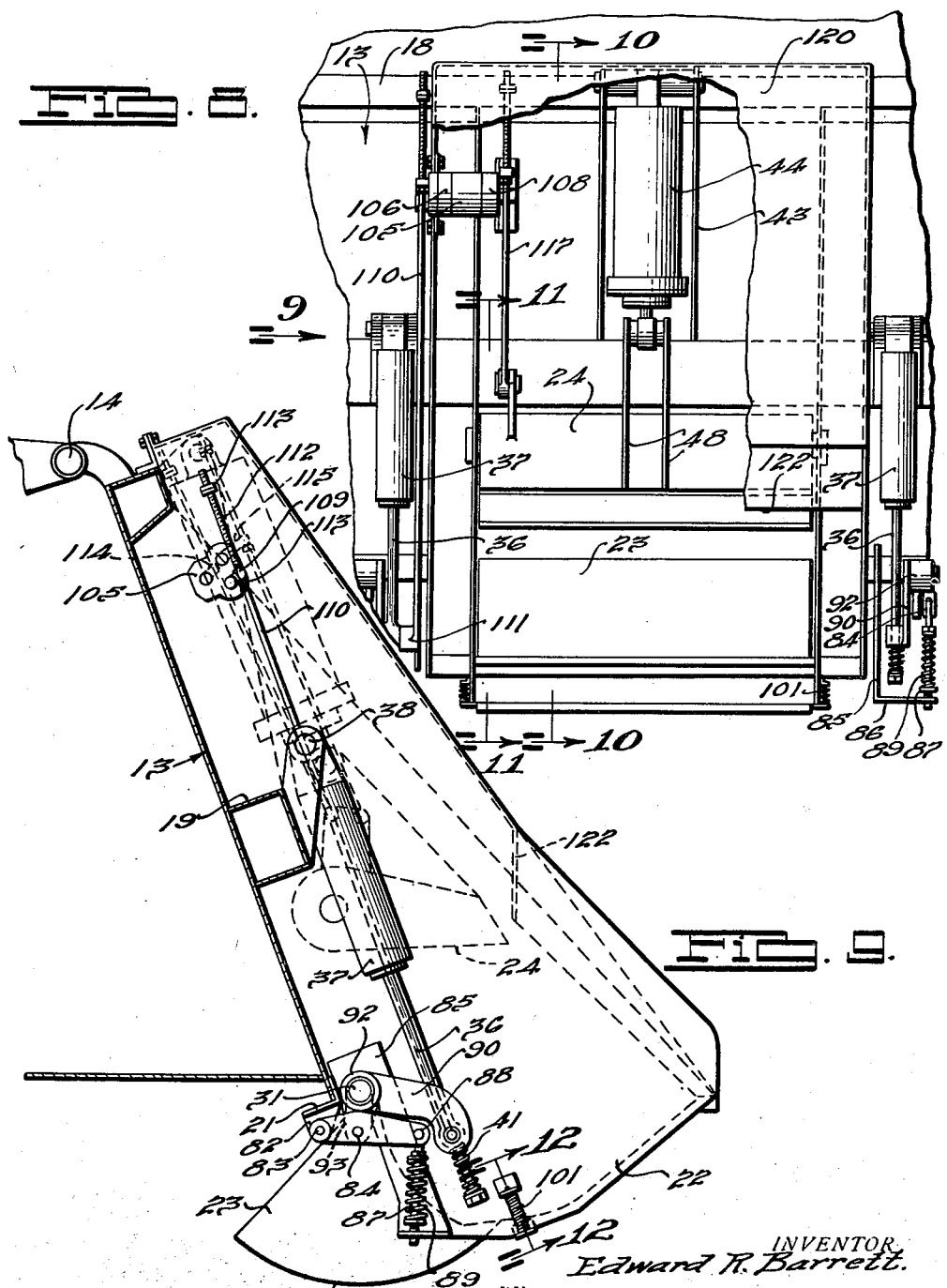

March 28, 1939.　　　　E. R. BARRETT　　　　2,151,887
VEHICLE LOADING DEVICE
Filed Dec. 1, 1937　　　5 Sheets-Sheet 5
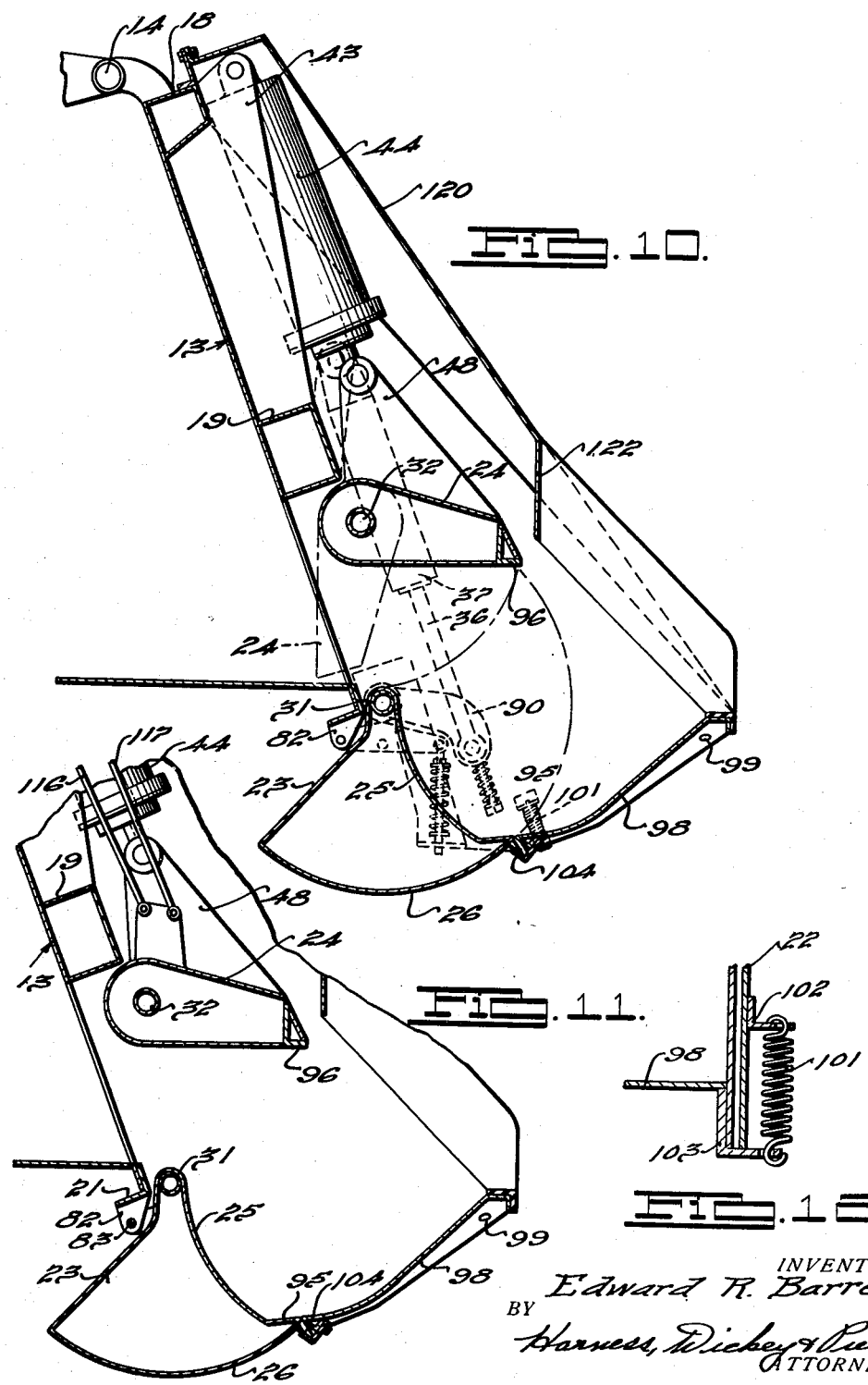
INVENTOR
Edward R. Barrett.
BY Harness, Dickey & Pierce.
ATTORNEYS.

Patented Mar. 28, 1939

2,151,887

UNITED STATES PATENT OFFICE 2,151,887

VEHICLE LOADING DEVICE

Edward R. Barrett, Detroit, Mich., assignor to Gar Wood Industries, Inc., Detroit, Mich., a corporation of Michigan Application December 1, 1937, Serial No. 177,451

3 Claims. (Cl. 214—67)

My invention relates to loading devices, and particularly to a device for loading and packing material in a confined space such as a truck body.

Heretofore it was the practice to employ a conveyor system for loading garbage and other materials in vehicle bodies or like confined spaces. Such a system is cumbersome, expensive to operate and delivers, but does not pack the material in the space.

In practicing my invention, I provide a tail gate for a vehicle body having a movable hopper thereon cooperating with a ram which forces the material from the hopper into the space to be loaded. While I have illustrated the device being utilized on a truck body for hauling garbage, it is to be understood that the hopper and ram combination may be employed for loading any material into a space, either confined or partly so. The device may be automatically operated to have the hopper continuously moving toward and away from the ram to deliver the garbage or material thereto, and have the ram continuously moving the material from the hopper when in raised position and force it into the provided space.

No difficulty was experienced in packing 30 or 40 yards of garbage in a body that held only 20 yards when the garbage was loosely conveyed therein. The mechanism for loading is not only materially simplified, reducing the operating cost, but the capacity of the body or space is actually increased 50 to 100% because the material is packed within the space.

The ram and hopper have an operating device associated therewith which is controlled from a power take-off unit driven by the engine of the vehicle for operating the ram and hopper directly from the vehicle engine. A suitable valve system is employed for controlling the actuation of the devices either continuously, or periodically each time the hopper becomes filled with the material.

Accordingly, the main objects of my invention are, to provide a hopper and a ram adjacent to a space to be filled which work in conjunction with each other to force material placed in the hopper into a space provided therefor; to provide an end gate on a vehicle body having mounted thereon a hopper and ram which are actuated in synchronism to raise the material and force it within the body; to provide a hopper on an end gate of a body and the hopper is operated by hydraulic means to raise the material disposed therein adjacent to a ram which is also hydraulically operated and which forces the material from the hopper to within the body; and in general, to provide means for loading a body, which is simple in construction, positive in operation and economical of manufacture.

Other objects and features of novelty of my invention will be either specifically pointed out or will become apparent when referring, for a better understanding of my invention to the following description taken in conjunction with the accompanying drawings, wherein:

Figure 1 is a view in side elevation of a vehicle body having a loading device thereon, embodying features of my invention.

Fig. 2 is an enlarged broken end view of the structure illustrated in Fig. 1 as viewed from line 2—2 thereof;

Fig. 3 is a sectional view of the structure illustrated in Fig. 2, taken on the line 3—3 thereof;

Fig. 4 is a sectional view of the structure illustrated in Fig. 2, taken on the line 4—4 thereof;

Fig. 5 is a diagrammatical view of the main control circuit employed with the loading mechanism illustrated in the various described views;

Fig. 6 is a diagrammatic view of a circuit employed with the hydraulic operating means for the loading elements;

Fig. 7 is an enlarged sectional view of a valve illustrated in Fig. 6;

Fig. 8 is a fragmentary rear elevational view, similar to that shown in Fig. 2, of a modified embodiment of the present invention;

Fig. 9 is a side elevational view, taken in the direction of the arrow 9 in Fig. 8;

Fig. 10 is a cross sectional view taken substantially along the line 10—10 of Fig. 8;

Fig. 11 is a fragmentary cross sectional view taken substantially along the line 11—11 of Fig. 8; and Fig. 12 is an enlarged fragmentary cross sectional view taken substantially along the line 12—12 of Fig. 9.

The vehicle body 10, illustrated in Fig. 1, is mounted on a chassis 11 of a truck, and is of the enclosed type employed for loading, hauling and dumping garbage. The rear wall 12 of the body is sloped and has an end gate 13 secured thereto on pivots 14. The end gate encloses the rear of the body and is secured thereto by suitable clamps 15 which are released when the material in the body is to be dumped. Hoists 16 are provided between the chassis 11 and the body 10 which are extended to cause the body to rotate about the pivots 17 to raise its front end and permit the material to pass out of the rear opening, the end gate 13 thereof automatically swinging open after the clamps 15 are removed. The end gate 13 carries a loading device in which the garbage is disposed and automatically packed into the body 10.

Referring more particularly to Figures 2, 3 and 4, the end gate 13 is reinforced by suitable bracing elements 18 and 19 and an angle element 21, all of which extend laterally thereacross. Intermediate the side edges of the end gate 13, spaced plates 22 are supported between which a hopper bottom 23 and a ram 24 are pivotally mounted for synchronized movement. The hopper is provided with a movable bottom member having a top arcuate surface 25 and a front adjacent arcuate surface 26, the latter of which is engaged by a lip 27 of an apron 28 which is also pivoted between the plates 22. The pivot 29 is disposed inwardly of the front edge of the apron to provide a weight preponderance for moving the apron into engagement with the arcuate surface 26. The arcuate surface 26 is struck on a radius from the pivot 31 of the hopper while the arc of the surface 25 is struck from the pivot 32 of the ram 24 when the hopper bottom 23 engages the end thereof.

An arm 34 is secured to each end of the pivot 31 of the hopper bottom having a pivotal connection at 35 with piston rods 36 which project within cylinders 37 which are pivoted at 38 to brackets 39 mounted on the brace 19. The rods 36 extend through the pivotal connectors 35, the ends extending being provided with a spring 41 secured by a pair of nuts 42 which are in adjusted locked relation. The spring permits the movement of the pistons in the cylinders when the hopper bottom 23 has material jammed between the ram 24 and thereby prevents damage to the operating structure.

The brace 18 is connected with the brace 19 by a pair of vertically disposed, spaced brackets 43 which provide a support for a cylinder 44 on a pivot 45. The cylinder carries a piston having a rod 46 projecting therefrom which is pivoted at 47 to a bracket 48 carried by the ram 24. The movement of the piston within the cylinder rotates the ram 24 about the shaft 32 to sweep the material deposited on the surface 25 into the space within the body 10 when the hopper bottom 23 is recessed. As more of the material is moved into the space it becomes packed therein by the ram, increasing materially the carrying capacity of the body.

In Fig. 5, I have shown a diagrammatical view of the main circuit and valve which is connected directly to the power take-off device of the truck. Fluid is delivered from a pump driven by the truck engine, through a conductor 51 into a valve 52 which may be turned to deliver fluid through a conductor 53 to the lifting jacks of the chassis or through a conductor 54 and valve 55 to the circuit for controlling the operation of the hopper and ram. When the valve 52 is delivering a fluid to the lifting jacks, fluid is cut off from the conductor 56 to the loading device to thereby prevent its operation while the body is raised. When fluid is delivered to the conductor 54 the valve 55 may be opened to have the loading mechanism continuously operate automatically or the valve may be opened to produce a single cycle of operation. A control circuit to the cylinders 37 and 44 is shown in Figs. 6 and 7 for the purpose of illustration, it being understood by those skilled in the art that other control structure could be utilized for producing the synchronized operation.

When the valve 55 is opened, fluid will be delivered to the conductors of the control system illustrated in Fig. 6. Assuming the hopper 23 and ram 24 to be in the position illustrated, that when both are withdrawn from the opening in the end gate, fluid will be directed through a conductor 57, through a valve 58 and a conductor 59 to the lower end of the cylinders 37 to cause the pistons and rods 36 to move upwardly and to cause the hopper 23 to rotate upwardly about the pivot 31. A control arm 61, fixed to pivot 31, strikes the plunger 62 of a valve 63 near the end of the upward movement of the hopper to direct fluid under pressure through conductors 64 and 65 to the upper end of the cylinder 44. The downward movement of the piston and rod 46 actuates the ram 24 in a clockwise direction about its pivot 32 to sweep across the surface 25 of the hopper bottom and project into the opening in the end gate. During the downward movement of the piston, the fluid therebelow in the cylinder will pass through a conductor 66 and discharge out through a valve 67 and a conductor 68.

An arm 69 is secured to shaft 32 and is movable thereby to depress a plunger 71 of a valve 72 for energizing a circuit 73 and delivering fluid to the upper side of the piston within the cylinders 37. When the ram moves down, the fluid on the opposite side of the piston is released through the valve 58 and conductor 75. The downward movement of the pistons rotate the hopper bottom 23 in a clockwise direction about the shaft 31 to the position illustrated in the figure. The actuating arm 61 depresses the plunger of the valve 67, reversing the flow of fluid in the conductor 66 to thereby move the piston of the cylinder 44 upwardly. The fluid on the top of the piston of the cylinder 44 is vented through the conductor 65 through the valve 63, the position of which was changed through the movement of actuating arm 61 therefrom to permit the fluid to discharge through the conductor 76. This movement of the piston in the cylinder 44 retrieves the ram 24 from a position within the opening to that illustrated in the drawings, which completes a cycle of movement.

During the final upward movement of the ram 24, the actuating arm 69 depresses the plunger of the switch 58 to permit fluid to be delivered to the lower side of the pistons within the cylinders 37 to effect the upward movement of the hopper bottom 23. The actuating arm 61 releases the plunger 67 and changes the conductor 66 from a delivery to a return conductor. Near the end of the upward movement, the actuating arm 61 depresses the plunger 62 of the valve 63, causing fluid to flow through the conductor 64, the valve 63 and conductor 65 to the upper end of the cylinder 44 to thereby effect the downward movement of the ram 24. At the beginning of the downward movement of the ram 24, the actuating arm 69 releases the plunger of valve 58 to thereby change the circuit 59 from a conducting to a venting circuit. Near the bottom of the stroke of ram 24, the actuating arm 64 depresses plunger 71 of valve 72 to provide a flow of fluid through the valve and conductor 73 to the upper ends of cylinders 37 to cause the pistons therein to move downwardly to return the hopper bottom 23 to its initial position as illustrated.

In Fig. 7, I have illustrated the valve 63 in section with the plunger 62 depressed by the actuating element 61 against a spring 79. Fluid under pressure may enter through conductor 64 through the valve 63 and out through the conductor 65. When the actuating element 61 is moved from the valve, the plunger 62 will move outwardly under the bias of the spring 79, to have the conductor 65 connected with the conductor 76 for returning the fluid to a reservoir.

It will thus be seen that the control system for operating the ram and hopper in synchronism is extremely simple, produced by utilizing the two distinct positions of the ram and hopper bottom for controlling the position of the valves. The particular control system is shown more for the purpose of illustration, and it is to be understood that other structure and modes of operation could be substituted for the structure shown.

In Figs. 8 to 12 a modified embodiment of the present invention is illustrated in which the hopper bottom and apron are lowered so that a greater amount of material may be charged in the loading device. Also in this embodiment of the invention, the hopper bottom and apron forming the initial receiving receptacle are resiliently mounted; and the hopper bottom is given a slight change in shape so that it may be wiped clean by the ram when the material is charged into the truck. Also, in this embodiment of the invention, a slightly modified structure is provided for controlling the supply of fluid to the operating cylinders. This modified structure includes a pilot valve which controls the flow of the fluid to the cylinders and by which the relatively large piping leading to the cylinder valves, as shown in Fig. 6, is dispensed with.

Referring to Figs. 10 to 12 in detail, resilient means are provided for resiliently mounting the hopper bottom 23, at each side of the hopper bottom. The mounting means at one side of the hopper bottom is duplicated on the other side of the hopper bottom and a detailed description of one side will suffice for both. Resilient mounting means include downwardly directed brackets 82, which are secured to the transverse angle brace 21 at each side of the hopper bottom. The brackets 82 pivotally receive therein a transversely extending pivot rod 83 which has keyed thereto, at its ends, a rearwardly directed supporting arm 84. Each of the arms 84 is keyed to the pivot rod 83 so that upon movement of one of the arms, such movement is transmitted to the other arm through the shaft 83 and the two arms 84 will move together. The rearmost end of each arm 84 is resiliently supported by a downwardly directed bracket 85 which is secured at its upper end to the angle brace 21. The bracket 85 has a sidewardly directed substantially horizontal supporting portion 86 which slidingly receives through an opening in the portion 86 an upwardly directed rod 87. The upper end of the rod is pivoted at 88 to the rear end of the arm 84; and a spiral spring 89 is interposed between the horizontal portion 86 and a washer adjacent the upper end of the pin 87 so that the rear end 88 of the arm 84 is resiliently supported. The piston rod 36 is resiliently connected to a pivot arm 90, which is similar to the arm 34 previously described. The arm 90 extends forwardly and has a hub portion 92 adjacent its forward end. The hub portion rests upon the top surface of the arm 84 and is pivotally connected to the arm 84 by a link 93. Both the support of the hub 92 on the top surface of the arm 84 and the link 93 form the support and connection for the arm 90 relative to the arm 84. The shaft 31 supports the hopper bottom 23 and is keyed to the arms 90 so that upon pivotal movement of the arms 90 the hopper bottom is oscillated. The mechanism just described affords a resilient support for the hopper bottom 23 so that any shock may be taken up in this resilient support.

The front arcuate surface 25 of the hopper bottom 23 is formed substantially straight and at a point as indicated at 95; and as the hopper bottom is swung upwardly to its charging position the straight surface 95 is wiped clean by the pointed rear edge 96 of the ram 24. The resilient support described above also takes up any shock incident to the engagement of the element 96 with the surfaces 95 and 25.

An apron 98 which corresponds to the apron 28 is pivotally mounted on a pivot 99 adjacent its rear edge and is resiliently supported adjacent its front edge by means of a spiral spring 101. The spiral spring 101 is secured to the frame plate 22 adjacent its upper end by means of a bracket 102 and is secured at its lower end to the apron 98 by means of a bracket 103. A resilient strip 104 is disposed along and fixed to the forward edge of the apron 98 and is adapted to resiliently abut up against the outer arcuate surface 26 of the hopper bottom 23 so that resilient engagement between the apron 98 and the bottom surface 26 is maintained during the operation of the hopper bottom.

The sequence of operations of the hopper bottom 23 and the ram 24 is the same in the embodiment illustrated in Figs. 8 to 12 as that illustrated in Figs. 1 to 6; but in the embodiment illustrated in Figs. 8 to 12 a simplified valve structure is provided for controlling the flow of fluid to the cylinders. A double pilot valve 105 is provided, having a bottom spool valve 106 and an upper spool valve 108. The pilot valve 105 is connected to the valves for the cylinders 44 and 37 by relatively small lead pipes (not shown) for actuating the valves for the cylinders. The valve 106 controls the actuation of the valves for the cylinder 37; and the valve 108 controls the actuation of the valve for the cylinder 44. The valve 106 is rotated to its proper position through a short arm 109 which projects into the path of a rod 110. The rod 110 is pivotally connected at its lower end 111 to the rear end of the arm 90 so that it moves therewith. The upper end of the rod 110 is threaded at 112 and is provided with adjustable nuts 113 which are adapted to strike against the arm 109.

The valve 108 is provided with a pair of arms 114 and 115 which control the actuation of the valve 108. A pair of rod members 116 and 117 are pivotally connected at their lower ends to the ram 24 and are threaded and provided with nuts adjacent their upper ends in the same manner as the rod 110. The rod 116 is adapted to actuate the arm 114 and the rod 117 is adapted to actuate the arm 115. The arm 114 is the distributor control which controls the flow to the valves 106 and 108 to give alternate action.

In operation, assuming that fluid is being supplied to move the hopper bottom 23 upwardly, the rod 110 moves upwardly and as the lower nut 113 strikes the arm 109 it is moved upwardly, cutting off flow of fluid to the cylinders 37. Fluid is then caused to flow in the cylinder 44 to force the ram 24 downwardly; and as the ram 24 reaches its downwardmost position the arm 115 is rotated to cut off flow of fluid to the cylinder 44, and the arm 114 is moved downwardly to cause the flow of fluid to the cylinder 37. The hopper bottom 23 is then moved downwardly and as it reaches its downwardmost position it actuates the arm 109 to cut off the flow of fluid to the cylinder 37. The arm 114 is then in such a position as to permit flow of fluid to the cylinder 44 and the cylinder 44 is actuated to raise the ram 24 to its initial position. The arms of the valve 105 are then in their initial position and the operation is repeated.

A cover 120, having an opening 122 therein above the apron 80, is provided over the mechanism so as to keep the mechanism relatively free of dirt.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A loading device embodying a hopper for receiving a material to be loaded, a combined material packer and closure for an opening to a space to be loaded, means for moving the bottom of said hopper towards and from said opening, means for moving said combined closure and packer to and from said opening for engaging the material resting in said hopper and moving it into said space, and automatic means for moving the hopper bottom and the closure in synchronism in the following sequence; moving the closure from said opening; the hopper bottom towards said opening; the closure towards said opening to engage the material resting in said hopper and move it into said space; and finally for lowering the hopper bottom.

2. A loading device for a truck body including, in combination, an end gate provided on said body having an opening, a combined material packer and closure for said opening, means for operating said combined packer-closure, a hopper disposed below said opening for receiving a quantity of material, a movable bottom for said hopper, means for moving said hopper bottom towards and from said opening, an apron disposed adjacent to and independent of the hopper bottom upon which material may be dumped when delivering thereto, and yielding means for constantly urging said apron in contact with said hopper bottom.

3. A loading device for a truck body, including, in combination an end gate provided on said body having an opening, a closure for said opening, means for operating said closure, a hopper disposed below said opening having a movable bottom, means for resiliently mounting said hopper, means for operating said hopper bottom toward and from said opening in synchronism with the movement of said closure whereby with the closure moved away from the opening the hopper bottom will raise the material adjacent thereto, which will be forced through the opening by the closure, when the closure is moved toward the opening.

EDWARD R. BARRETT.